Re 7362 10-24-1876
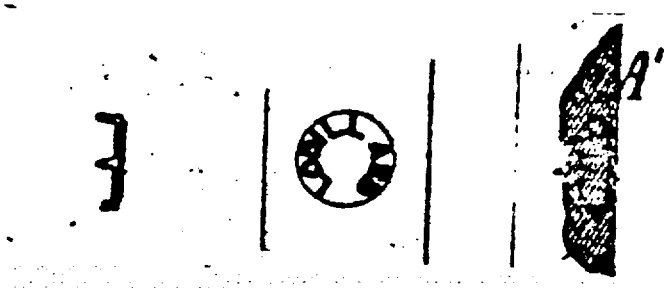

BEST AVAILABLE COPY

BEST AVAILABLE COPY

UNITED STATES PATENT OFFICE.

CHARLES SIEDLER, OF NEW YORK, N. Y.

IMPROVEMENT IN PLUG-TOBACCO.

Specification forming part of Letters Patent No. 158,604, dated January 12, 1875; Reissue No. 7,362, dated October 24, 1876; application filed April 26, 1875.

*To all whom it may concern:*

Whereas, Letters Patent No. 158,604, of the United States of America, were granted to me, CHARLES SIEDLER, of New York city, New York, bearing date the 12th day of January, 1875, for certain improvements relating to Plug-Tobacco; and whereas, I am advised by counsel that said patent is not fully available to me by reason of an insufficient and defective specification, and I have applied for leave to surrender the said patent and to have a new patent issued on an amended specification; now, therefore, I, the said CHARLES SIEDLER, do hereby declare the said invention to be fully described in the following specification.

I have discovered, and successfully developed in practice, a means of marking and distinguishing tobacco in plugs. I prepare labels or distinguishing pieces of separate material, and impress them into the body of the plugs, one label into each plug, preferably putting the label under the outside wrapper, and giving it a character, by raised letters or analogous devices, which is recognizable through the flexible covering.

The preferable material for my labels I esteem to be sheet-iron tinned. The preferable form I esteem to be circular. The preferable devices I esteem to be marks indicating the quality, origin, or trade-mark. The preferable mode of making the marks apparent is by raising or sinking portions of the surface. To insure a firmer retention of the label I form it with prongs projecting inward into the body of the tobacco-plug.

The accompanying drawings form a part of this specification, in which—

Figure 1 is a view of a plug of tobacco with my label applied, viewed facewise. Fig. 2 is an edge view of the label detached; and Fig. 3 is an edge view of the plug of tobacco, with a section through the label and that portion of the plug immediately adjacent thereto.

Similar letters of reference indicate like parts in all the figures.

A is the body or strongly-compressed main portion of a plug of tobacco. B is a small and tastefully-shaped piece of thin tinned iron, cut by a punch or otherwise into the form desired, and struck up by dies, so as to present on the face the desired letters or marks, and having points *b* bent backward from its edges. Before giving the plug of tobacco its final pressure, the metal B *b* is placed in proper position upon it by an attendant, and, by subsequent powerful pressure, the label is sunk into the body of the tobacco, so that its face is about flush with the outer surface thereof, and its points *b* sink quite deeply into the moist dense mass. It adheres firmly. The points *b* may be widened, so as to form a nearly or quite continuous rim sunk into the tobacco, if desired. The plugs thus impressed with the hard labels, presenting the letters in relief, are then wrapped in a large leaf of properly-dampened tobacco, A′, and again powerfully compressed. The label appears beneath the wrapper of the finished plug, and is not liable to be removed by any ordinary or extraordinary cause.

I claim as my invention—

1. A plug of tobacco having a hard label pressed into one of its faces, as specified.
2. A plug of tobacco having a label under its ultimate wrapper, as specified.
3. A plug of tobacco having letters or other decorative and distinguishing marks produced on a hard metallic surface, and pressed, as specified.
4. The within-described method of marking plug-tobacco, by impressing a thick label into one of its faces, as specified.
5. The within-described method of marking plug-tobacco, by impressing a thick label into one of its faces, and covering it with the wrapper A′, as herein specified.

In testimony whereof I have hereunto set my hand this 23d day of April, 1875.

CHARLES SIEDLER.

Witnesses:

GEO. D. FINLAY,
FRED. COOL.